United States Patent [19]

Engel

[11] Patent Number: 4,509,960
[45] Date of Patent: Apr. 9, 1985

[54] DUST COLLECTOR

[75] Inventor: Mark R. Engel, Apple Valley, Minn.

[73] Assignee: Donaldson Company, Inc., Minneapolis, Minn.

[21] Appl. No.: 540,121

[22] Filed: Oct. 7, 1983

Related U.S. Application Data

[63] Continuation-in-part of Ser. No. 522,348, Aug. 11, 1983.

[51] Int. Cl.³ .............................................. B01D 46/04
[52] U.S. Cl. .......................................... 55/287; 55/294; 55/481; 55/341 HM; 55/506; 251/29; 251/144
[58] Field of Search .................................. 55/285–287, 55/294, 302, 344, 422, 481, 506, 341 HM; 251/43, 44, 29, 144

[56] References Cited

U.S. PATENT DOCUMENTS

| | | | |
|---|---|---|---|
| 1,784,278 | 12/1930 | Dollinger | 55/96 |
| 2,072,906 | 3/1937 | Rosenberger | 55/341 HM |
| 2,758,811 | 8/1956 | Peterson | 251/44 |
| 3,183,647 | 5/1965 | Lang | 55/302 |
| 3,297,297 | 1/1967 | Hoffman | 251/43 |
| 3,395,517 | 8/1968 | Lang et al. | 55/285 |
| 3,535,851 | 10/1970 | Riemsloh | 55/341 HM |
| 3,616,614 | 11/1971 | Eisenegger | 55/294 |
| 4,157,899 | 6/1979 | Wheaton | 55/294 |
| 4,218,227 | 8/1980 | Frey | 55/302 |
| 4,277,260 | 7/1981 | Browning | 55/302 |
| 4,364,751 | 12/1982 | Copley | 55/302 |

FOREIGN PATENT DOCUMENTS

| | | | |
|---|---|---|---|
| 906638 | 1/1946 | France | 55/481 |
| 5119 | 2/1970 | Japan | 55/96 |

*Primary Examiner*—David L. Lacey
*Attorney, Agent, or Firm*—Merchant, Gould, Smith, Edell, Welter & Schmidt

[57] ABSTRACT

The present invention is directed to a dust collector (100). Dust collector (100) has a housing (102) separated by partition (130) into inlet chamber (126) and clean air chamber (128). A clean air drum (140) rotatably supports columns of horizontally extending, filter elements (142). A low pressure, high volume pulse apparatus (10) is operable through blowpipe (148) to sequentially provide a low pressure reverse pulse to a column of filter elements (142) thereby separating any dust cake from them and allowing it to fall into conical portion (106) for removal from collector (100) by air lock (108). The motor (158) which rotates blowpipe (148) also disengageably rotates clean air drum (140) and attached filter elements (142) to align a column of filter elements (142) with door assembly (114) for maintenance.

6 Claims, 10 Drawing Figures

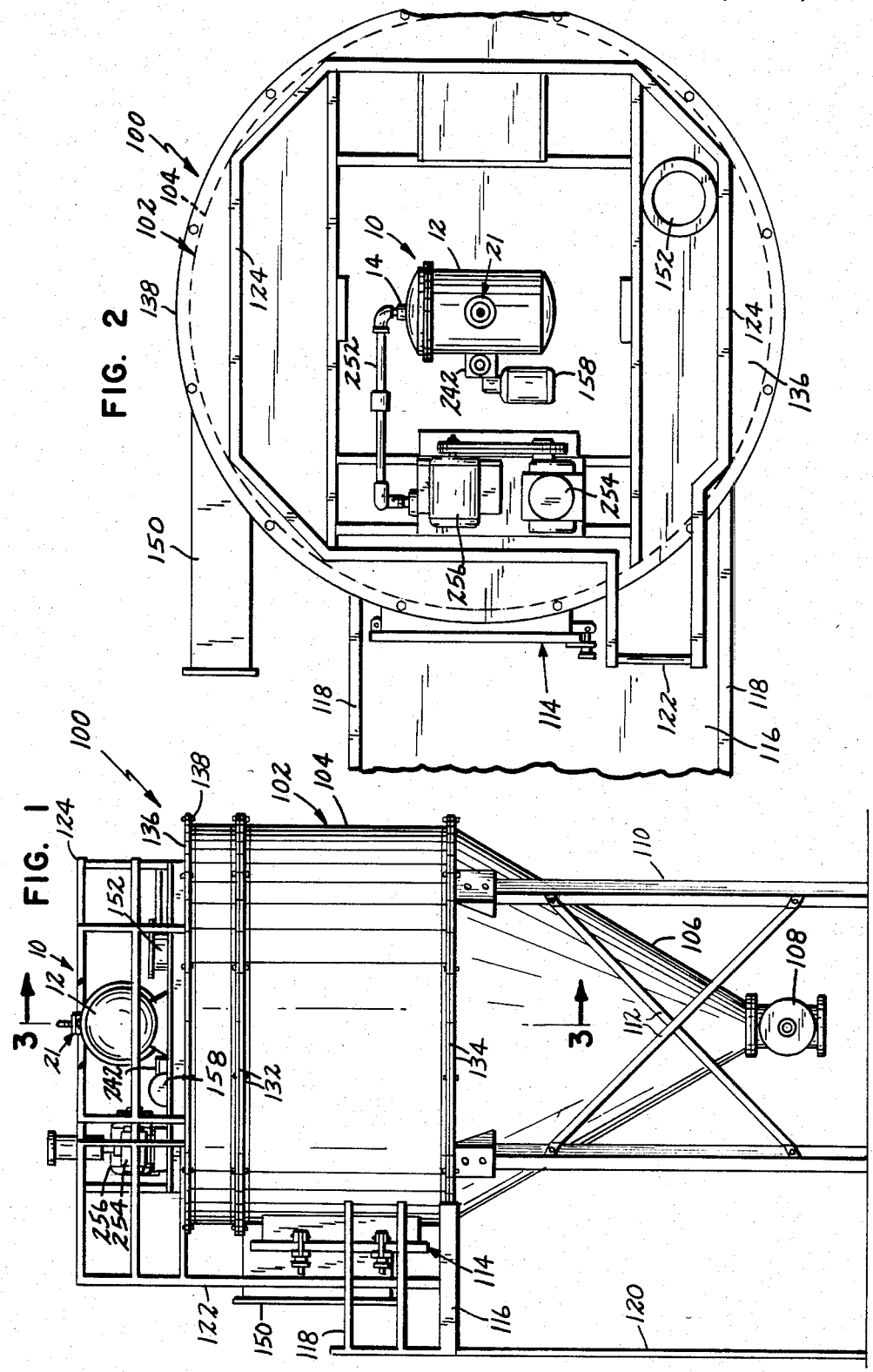

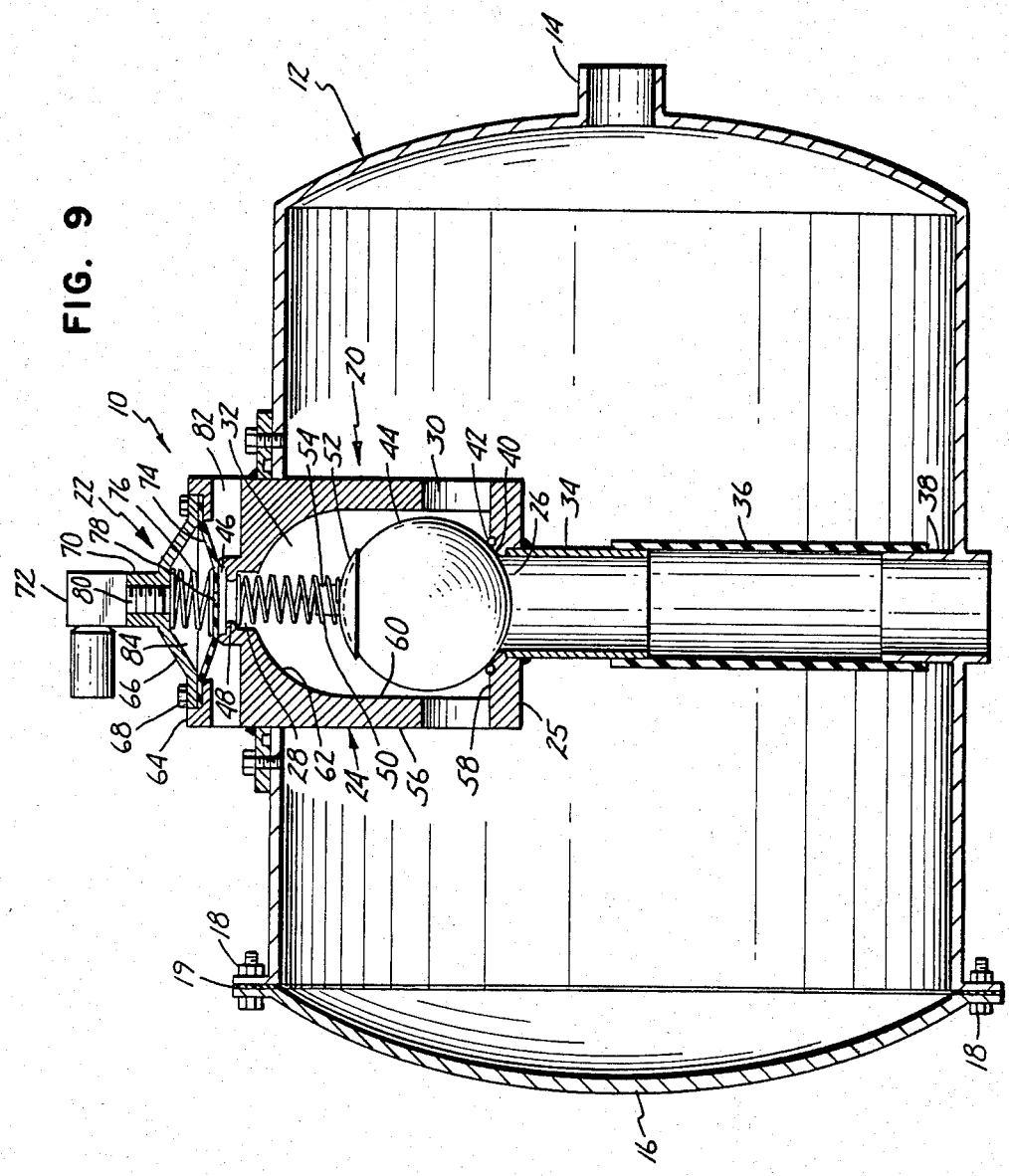

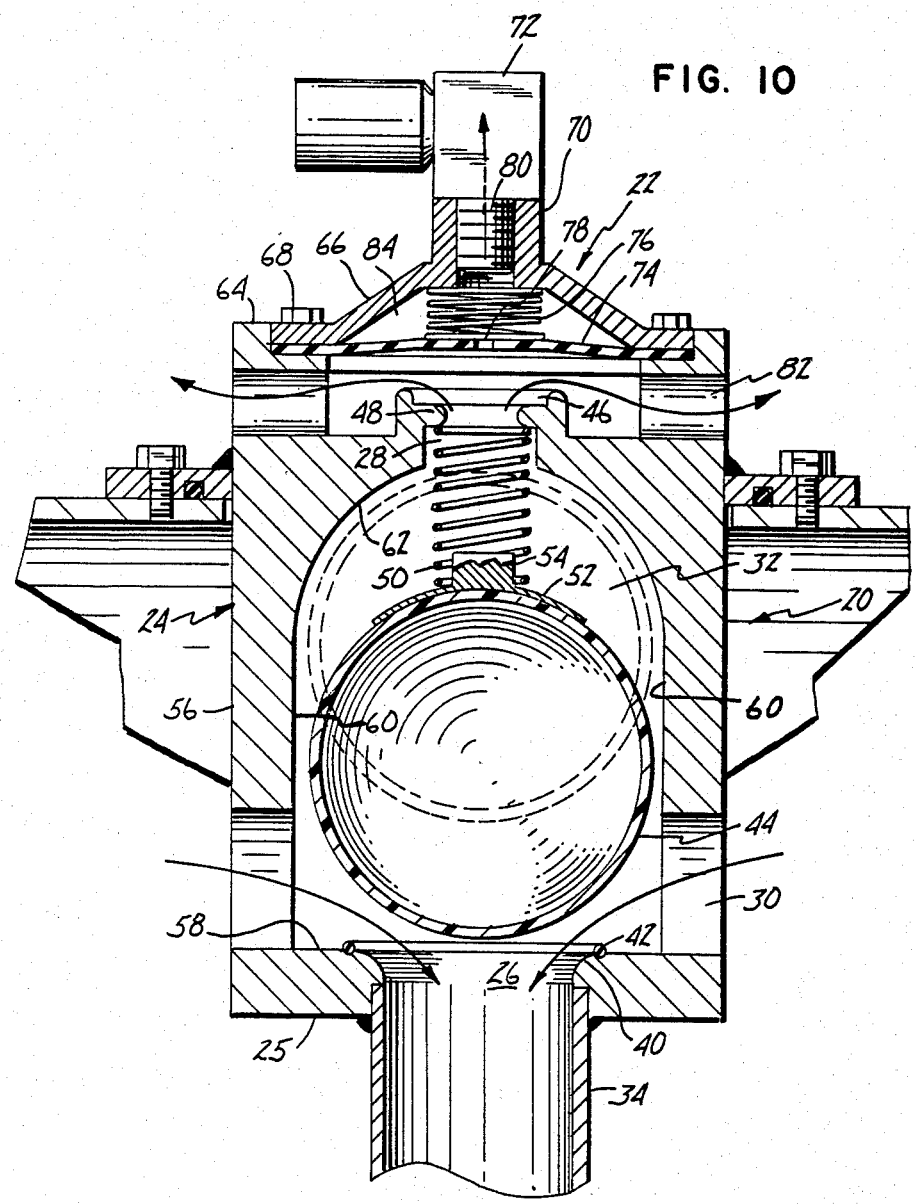

DUST COLLECTOR

This application is a continuation-in-part of Ser. No. 522,348, filed Aug. 11, 1983.

FIELD OF THE INVENTION

The present invention is directed to a dust collector for use as a continuous-duty, industrial air cleaner. Present collectors are commonly of the woven bag type and utilize mechanical shaking or high pressure reverse air pulses or jets as cleaning mechanisms. The present invention is a new concept using a low pressure reverse pulse for cleaning thereby leading to elimination of the woven bags and instead use of horizontally extending filter elements.

BACKGROUND OF THE INVENTION

The avoidance of air pollution has motivated industry to prevent discharge into the atmosphere and rather to capture often commercially valuable, particulate matter. Such dust collection is distinguished from simple air filtration in that collection requires periodic dust removal so as to maintain efficient cleaning and to accumulate the collected dust. Industrial dust collection equipment generally removes collected particulate matter from the filtering medium using either high pressure air pulses or jets or mechanical shaking mechanisms.

The cleaning mechanisms are better understood with reference to commonly used equipment. Industrial dust collection equipment is generally constructed in the form of a housing divided into inlet and clean air chambers. The two chambers are commonly separated by a partition having a plurality of apertures. Woven bags of suitable fabric, often on wire frames, are the usual filtering medium, and one is usually suspended beneath each aperture. When the mechanical shaking mechanism is used for cleaning, a plurality of bags are usually hung from a single movable member. Several movable members with such bags comprise a collection system. Various motors, gears, and eccentric or bellcrank members commonly make up an assembly for physically shaking all bags attached to the movable members. The shaking assembly is controlled so as to sequence the shaking of the bags attached to each movable member in a serial or other such fashion. Such physical shaking cleaning mechanisms were most common years earlier. The systems included many movable parts and in our contemporary economy would be quite expensive to manufacture and also to maintain.

In a system using high pressure reverse air pulses, high pressure air is directed through a blow pipe passing over nozzles leading to a plurality of bags. Alternatively, high pressure air is piped to individual valves in proximity with the open end of respective bags. The reverse pulses provide sufficient reverse air to overcome forwardly moving air and provide at the leading edge of the pulse sufficient pressure to slightly shock the bags thereby loosening caked dust. The dust cake falls from the bags to the bottom of the inlet chamber of the housing for removal either intermittently or continuously with, for example, a rotary airlock.

Collector systems using high pressure cleaning mechanisms require a large volume of compressed air. Often the compressor for an industrial plant cannot supply enough air for effective cleaning. Consequently, a separate purchase of an air compressor is not uncommon. Additionally, piping systems of high pressure air are expensive and difficult to construct. If a piping system becomes very long, pressure within the piping and any losses adds more expense with respect to number and size of compressors needed.

Another disadvantage with systems using high pressure air is that the dew point of air is elevated as it passes through a compressor. As the air cools after leaving the compressor, it loses its ability to retain moisture, and water condenses in the compressor's after cooler or piping system. Such moisture can create severe problems for dust collectors in that dust can cake or if ice forms, the cleaning hardware may become immediately inoperative. Often, an air dryer must be provided to remove the moisture. Such dryers, of course, add further system expense and maintenance requirements.

SUMMARY OF THE INVENTION

The present invention is directed to a dust collector which uses a low pressure reverse air pulse as a cleaning mechanism. One embodiment of such collector apparatus includes a housing divided into inlet and clean gas chambers. The chambers are separated by a partition. The inlet chamber has an inlet port and the clean chamber has an outlet port. The apparatus further includes a clean gas drum mounted to the partition such that the drum has an interior in fluid communication with the clean gas chamber. A plurality of filter elements are attached to the drum. The gas cleaned by each of the filter elements flows into the interior of the drum and continues to the clean gas chamber. The apparatus also includes mechanism for producing a low pressure, reverse gas pulse to clean the filter elements.

Preferably, the clean gas drum is oriented vertically and has a plurality of filter elements extending substantially horizontally therefrom. The pulse producing mechanism furnishes sufficient air quantity from a pressurized container to overcome forwardly moving air and yet provide a sufficiently rapid pressure buildup to shock each filter element thereby cleaning it as necessary.

A particularly advantageous reverse gas pulse producing mechanism includes first and second valves for controlling gaseous flow. Each of the valves includes a walled enclosure with three ports, a closure element, a mechanism for biasing the closure element to close the first of the three ports, a mechanism for bleeding fluid from one side of each closure element to the other, and a mechanism for relieving over-ambient pressure from a second side of the closure element of the second valve. The first valve is preferably located substantially within the pressurized container which is connected to a pressurizing source. The first valve closes at the first port the exit passage of the container, said exit passage being in fluid communication with a blow pipe rotatably mounted within the clean gas drum of the dust collector apparatus. Since each closure element has pressure equalized on both its sides, a rapid opening of the third port of the second valve relieves pressure from the second side of the closure element thereby causing the element to be forced away from the first port so as to provide a communication path for fluid from the first port to the second port. The second port of the second valve is exhausted, therefore, to ambient and as fluid passes through the first and second ports of the second valve, pressure is relieved from the second side of the closure element of the first valve so as to allow the closure element of the first valve to be forced away from the exit port of the low pressure container. Therefore, by properly sizing the various ports and elements, a large volume of low pressure air may be rapidly exhausted through the first valve to the blow pipe of the collection system.

Such a low pressure system advantageously bypasses the problems of a high pressure cleaning system as indicated hereinbefore. Firstly, a smaller quantity of air creates the necessary pressure as compared to a high pressure system. Usually, the existing compressor of an industrial plant will suffice as a pressurizing source. Secondly, low pressure piping connections are much simpler to install and maintain than comparable high pressure connections. Thirdly, low pressure compressed air inherently has a lower dew point than high pressure compressed air thereby alleviating the considerable number of problems caused by condensation.

In addition to resulting in acquisition, installation, operation, and maintenance cost advantages, the present invention has a number of advantageous structural features including the novel valve arrangement usable to create the low pressure pulse, as described above. Such low pressure system may be charged rapidly thereby allowing the use of a blow pipe rotatable about a vertical axis. Such blow pipe orientation makes possible horizontally extending filters. Horizontal filters may be advantageously maintained through a door in the side wall of a collector housing, as opposed to the more difficult removal and installation in present systems of vertically hanging bags within a housing. Furthermore, the motor which rotates the blow pipe may be engaged to also rotate the clean air drum with the attached horizontally extending, vertically stacked filters for selective inspection and maintenance at the door.

Although these advantages have been identified hereinbefore, these and other advantages and objects obtained by this invention are explained further hereinafter and, consequently, may be better understood by reference to the drawings and descriptive matter following. In particular, a preferred embodiment of the invention is illustrated and described in detail.

BRIEF DESCRIPTION OF THE DRAWINGS

FIG. 1 is an elevational view of dust collector apparatus in accordance with the present invention;

FIG. 2 is a top plan view of the apparatus of FIG. 1;

FIG. 9 is a cross-sectional, side view of the low pressure container and valves therein shown in FIGS. 1-3; and FIG. 10 is a cross-sectional, detailed view of the valves in FIG. 9 when they are in an open configuration.

DETAILED DESCRIPTION OF THE PREFERRED EMBODIMENT

Figure 3:
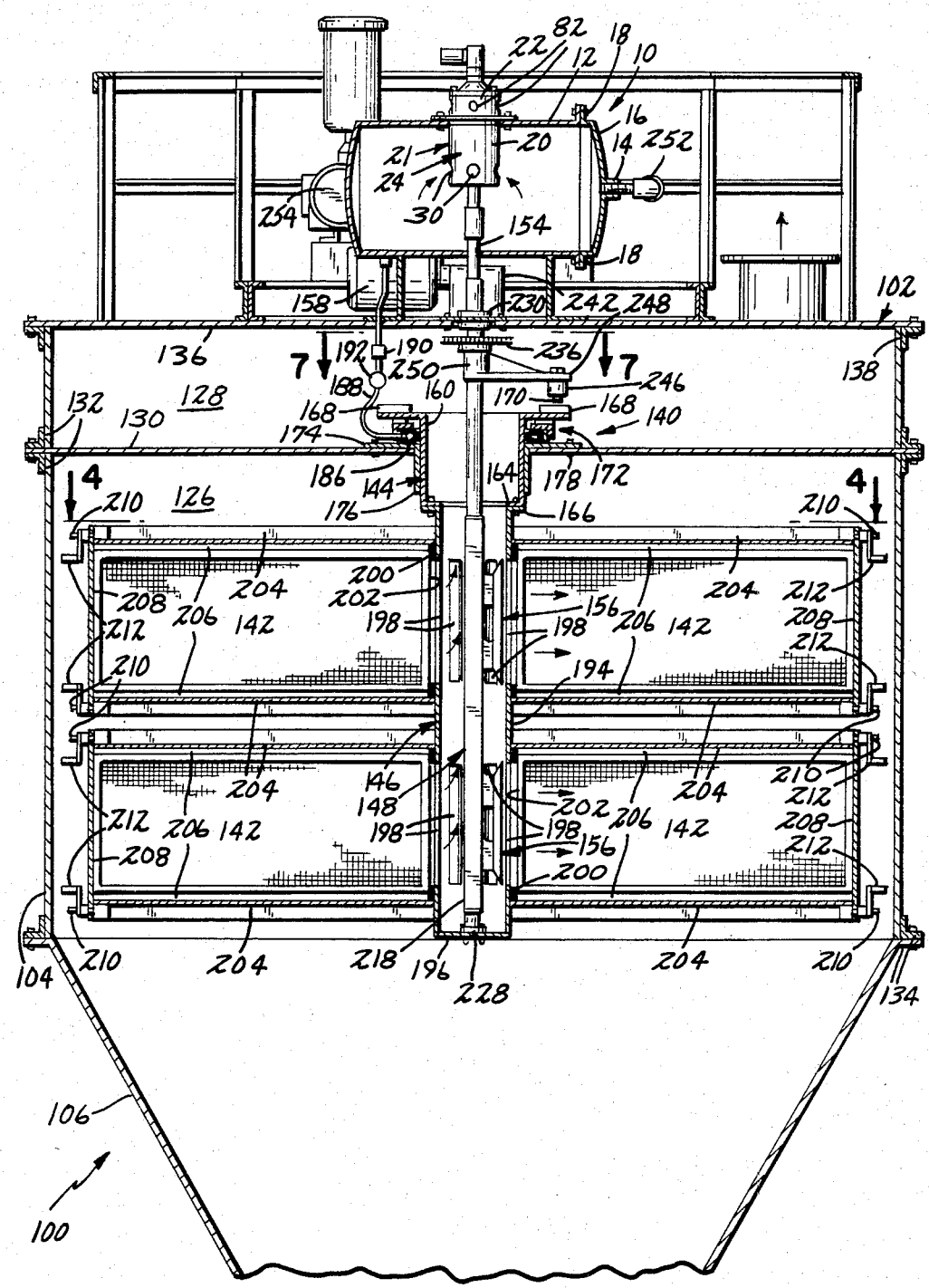
FIG. 3 is a cross-sectional view taken along line 3—3 of FIG. 1.

Referring now to the drawings wherein like reference numerals designate identical or corresponding parts throughout the several views, and more particularly to FIG. 1, dust collector apparatus in accordance with the present invention is designated generally by the numeral 100. Apparatus 100 includes a housing 102 with a cylindrical upper portion 104 and an inverted conical lower portion 106. A rotary airlock device 108 is located at the bottom of lower portion 106 for the purpose of removing aggregated dust from housing 102. Housing 102 is supported by a representative four-legged frame 110 having cross members 112 extending between pairs of legs. Upper portion 104 includes an access door assembly 114 in the cylindrical sidewall. As illustrated in FIG. 1, it is convenient to include a worker's platform 116 in the vicinity of door assembly 114. Safety rails 118 surround platform 116, and a ladder 120 provides access thereto. Similarly, system devices are located atop housing 102 so it is convenient to provide an access ladder 122 to the top of housing 102 and safety rails 124 thereabout.

As shown in FIG. 3, upper portion 104 of housing 102 includes an inlet chamber 126 and a clean air chamber 128 separated by a partition plate 130. Partition 130 is held between a pair of ringular flanges 132 on the cylindrical wall of upper portion 104. Flanges 132 and partition 130 are held together by a plurality of nuts and bolts or other commonly known fastening mechanism. Similarly, upper portion 104 is attached to lower portion 106 at a pair of flanges 134 with a plurality of nuts and bolts or other commonly known fastening mechanism. And, top plate 136 is attached to upper portion 104 at a ringular flange 138 with a plurality of nuts and bolts or other fastening mechanism.

Partition 130 has a central opening therein for passage of clean air drum 140 therethrough. Clean air drum 140 supports a plurality of vertical columns of horizontally extending filter elements 142. Clean air drum 140 includes an upper bearing portion 144 and a lower manifold portion 146. A blowpipe 148 is rotatably supported between the top 136 of housing 102 and the bottom of manifold portion 146 of clean air drum 140. Blowpipe 148 is preferably centered within housing 102 and clean air drum 140 with its center forming an axis for apparatus 100. Dust laden air enters apparatus 100 at a tengential port 150 (see FIG. 2) so that some dust may be cyclonically hurled against the cylindrical wall and allowed to fall to the bottom of housing 102 before the air is drawn through filter elements 142. Air passes through elements 142 into clean air drum 140 and upwardly into clean air chamber 128 before exiting at exhaust port 152 in top plate 136. Dust collects on filter elements 142.

Dust is cleaned from filter elements 142 by rapidly dumping low pressure air from container 12 through valve assembly 21 to pipe 154 connected through top 136 to blowpipe 148. Blowpipe 148 includes nozzles 156 for directing air into particular filter elements 142 in a particular column of elements 142. Blowpipe 148 may be rotatably repositioned, with mechanism shown in FIG. 7, by operating motor 158. In this fashion, a low pressure air pulse may be directed into filter elements 142 in each vertical column. The drive mechanism for blowpipe 148 may also be used to rotate clean air drum 140 to align a particular column of filter elements 142 with door assembly 114 to provide easy servicing or replacement of particular elements 142.

Figure 8:
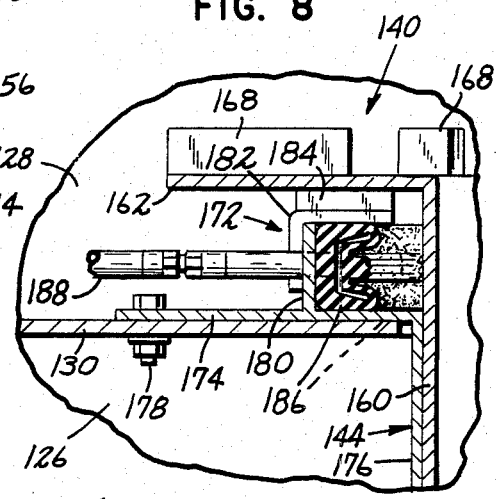
FIG. 8 is an enlarged view of the sealing mechanism between the rotatable clean air drum and the fixed partition attached to the collector housing, as seen from the lines 8—8 of FIG. 7.

As shown in FIGS. 3 and 8, upper bearing portion 144 of clean air drum 140 has an axially aligned, cylindrical wall 160 with an outwardly extending flange 162 at the top and an inwardly extending flange 164 at the bottom. Flange 164 mates with an outwardly extending flange 166 at the top of lower manifold portion 146 and is fastened thereto with a plurality of nuts and bolts or other fastening mechanism. A plurality of stops 168 extend upwardly from flange 162. Each stop 168 is aligned with a vertical column of filter elements 142. Stops 168 cooperate with solenoid operated plunger 170, as explained more fully hereinafter, to allow the drive mechanism for blowpipe 148 to rotatably move clean air drum 140.

Clean air drum 140 is supported by partition 130 and sealed between itself and immovable partition 130 at assembly 172. Assembly 172 includes ring plate 174 with a cylindrical sleeve 176 extending downwardly from the inside edge of plate 174. Sleeve 176 and plate 174 are welded or otherwise attached. Plate 174 is fastened with nut and bolt combinations 178 or other mechanism to partition 130. Sleeve 176 provides axial alignment support for clean air drum 140. A cylindrical support member 180 is welded or otherwise attached to ring plate 174 and extends upwardly therefrom at a location somewhat outwardly from the inside edge of ring plate 174. Right angular members 182 are attached to support 180 as shown and each has a bearing element 184 attached with a known mechanism to its flat top. Bearings 184 may be made from a synthetic material such as nylon which provides a low coefficient of sliding friction. An inflatable seal 186 of the type commercially available from Sealmaster Corporation, 368 Martinel Drive, Kent, Ohio 44240, is located against support 180 between plate 174 and angle member 182. Seal 186 is in fluid communication through tube 188 with low pressure container 12. Seal 186 expands as indicated in the broken lines in FIG. 8 against sleeve 160 of clean air drum 140. Line 188, as shown in FIG. 3, may include a check valve 190 to prevent depressurization of seal 186 when container 12 depressurizes into blowpipe 148 and a valve 192 for releasing the pressure when desirable. Valve 192 is preferably remotely controlled by appropriate electrical circuitry as known to those so skilled.

Figure 4:
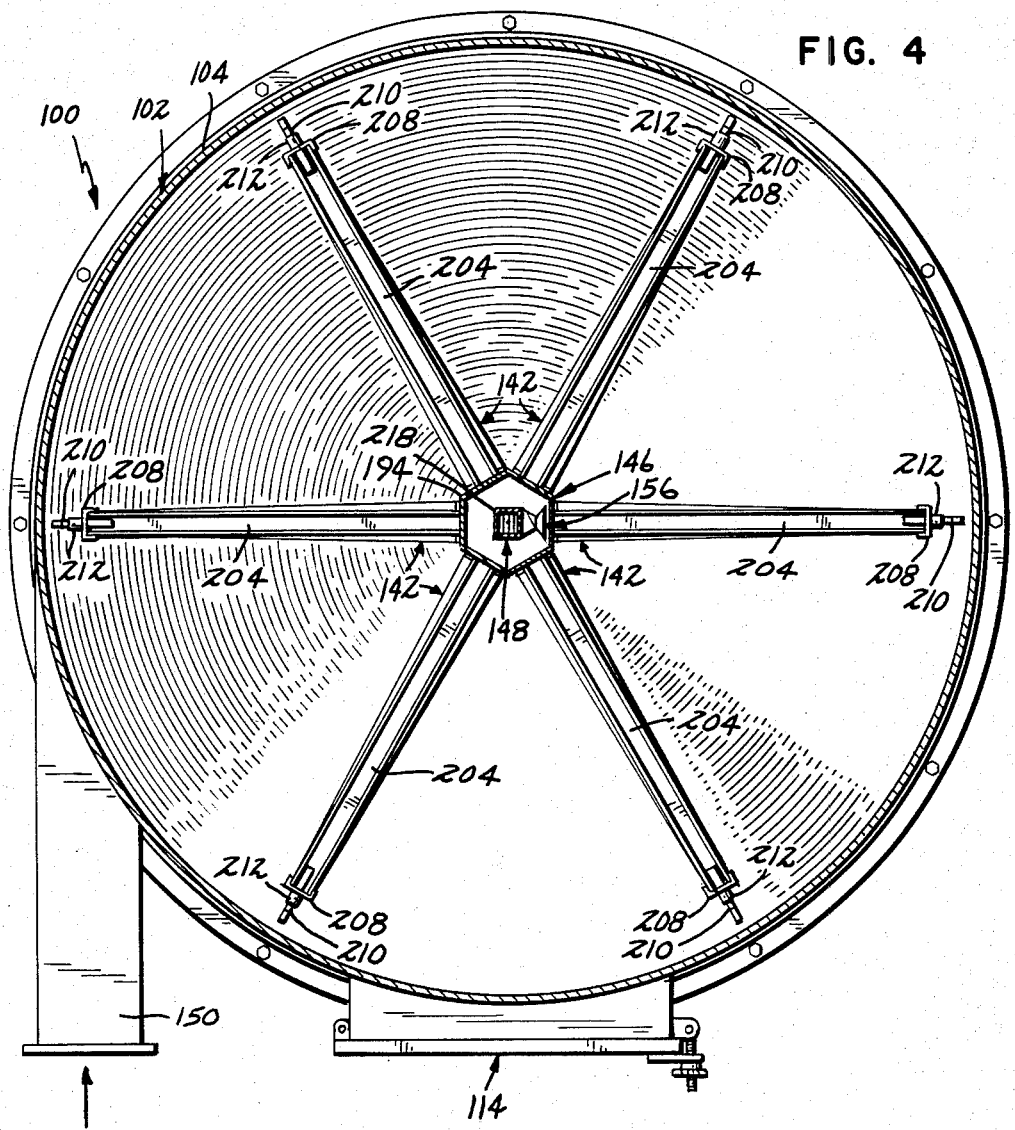
FIG. 4 is a cross-sectional view taken along line 4—4 of FIG. 3.
Figure 5:
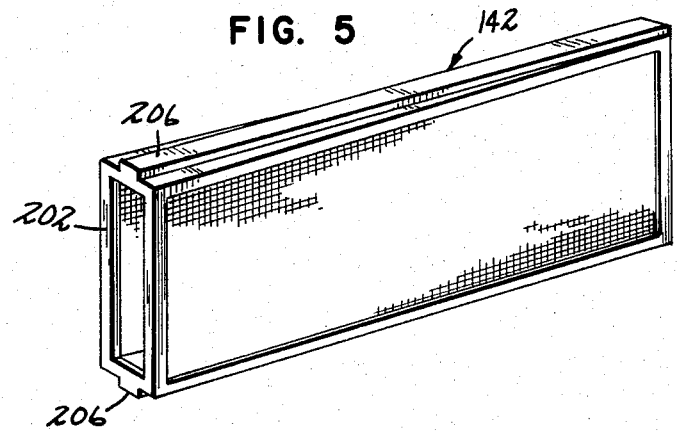
FIG. 5 is a view in perspective of a filter element usable with the present invention.
Figure 6:
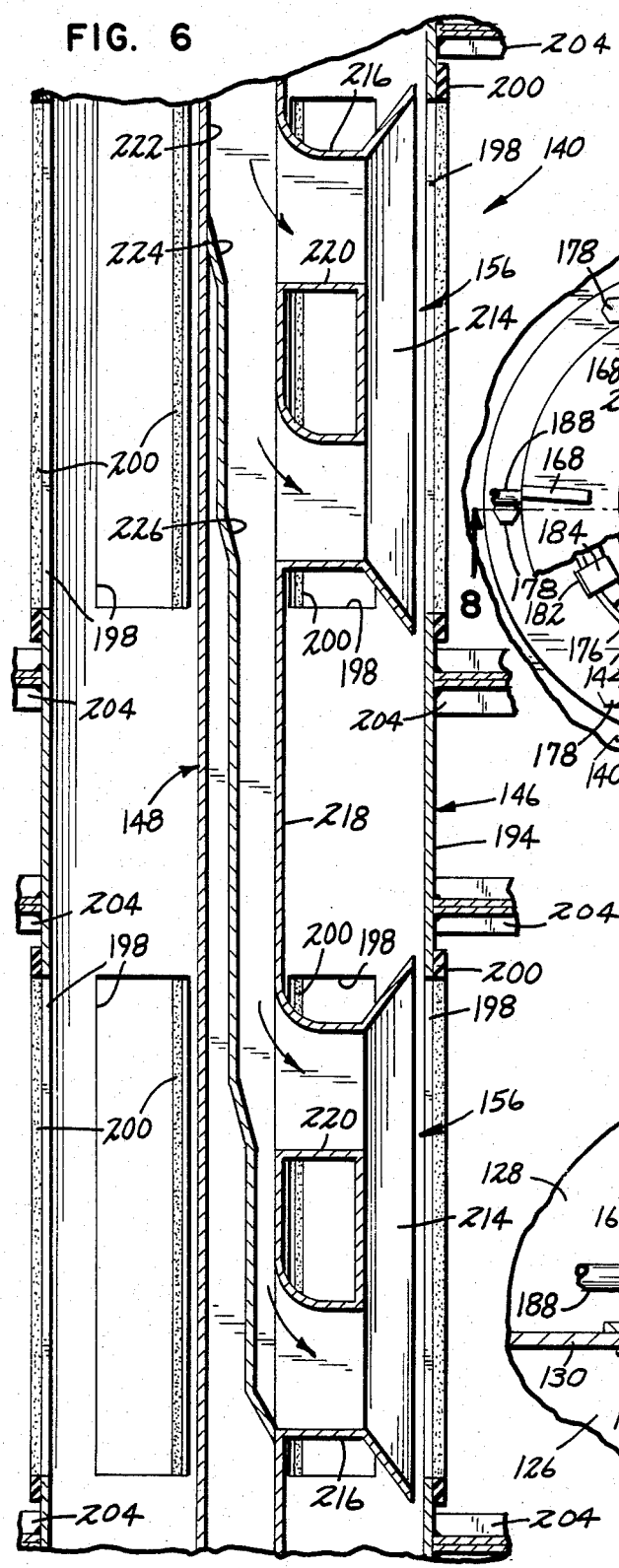
FIG. 6 is an enlarged view of a blow pipe in relation to the clean gas drum.

As shown in FIGS. 3 and 4, lower manifold portion 146 is a hexagonal-shaped, elongated enclosure 194 with a bottom 196 fastened by welding or otherwise at the lower end and an outwardly extending flange 166 attached at the upper edge. As shown in FIG. 6, enclosure 194 has a plurality of substantially rectangular openings 198 arranged in vertical columns and spaced equally or along each of the sides of enclosure 194. Openings 198 provide passageways from the inside of filter elements 142 to the interior of clean air drum 140. Openings 198 may have a perimeteral element 200 about them to provide an appropriate contact for the face 202 of a filter element 142 (see FIG. 5). Above and below each opening 198 is located a channel member 204 for receiving the complimentary protruding portion 206 at the upper and lower ends of each filter element 142. As shown in FIG. 3, when the filter elements 142 are slid between a pair of channel members 204 for contact at perimeteral element 200, a plate 208 is fastened to retain any particular filter element 142 in a proper operable position. Plate 208 has openings near its upper and lower ends to allow studs 210 to pass therethrough. Studs 210 are welded or otherwise attached to the ends of channel members 204. A crank 212 having a threaded end threads onto each of studs 210 in order to force plate 208 tightly against a filter element 142 to hold it properly in place.

Blowpipe 148, as indicated hereinbefore, includes vertically aligned nozzles 156. Each nozzle 156 includes a frusto-pyramidal end 214 (see FIG. 6) with a connecting neck 216 to pipe 218. The larger portion of end 214 conforms in shape substantially with opening 198 so that when air is projected into opening 198 it rapidly and completely fills the opening and allows a shock wave to propagate uniformly along both walls of a filter element 142. The smaller portion of end 214 mates with connecting neck 216. Neck 216 may include a central air diverging barrier 220. If so, barrier 220 divides the passageway within neck 216 into at least two portions as shown in FIG. 6.

Pipe 218 is substantially cylindrical at its top and bottom. In between, a portion is cut away and reduced in size so as to maintain a relatively uniform volumetric quantity of air per unit area of passageway both upstream and downstream of each nozzle 156. Thus, pipe 218 is reduced in size from its uppermost portion 222 at a point 224 near the upper side of barrier 220. Then, pipe 218 is further reduced in cross-sectional area at point 226 approximately in line with the lower side of upper neck 216. Similarly, pipe 218 is further reduced at each nozzle 156. If there is no barrier 220, then a single reduction in size of pipe 218 is sufficient with respect to each nozzle 156. As shown in FIG. 3, blowpipe 148 is rotatably held at its bottom at bearing mechanism 228 attached to bottom 196 of clean air drum 140. The upper portion of blowpipe 148 is held by a bearing 230 in top 136 of housing 102.

Figure 7:
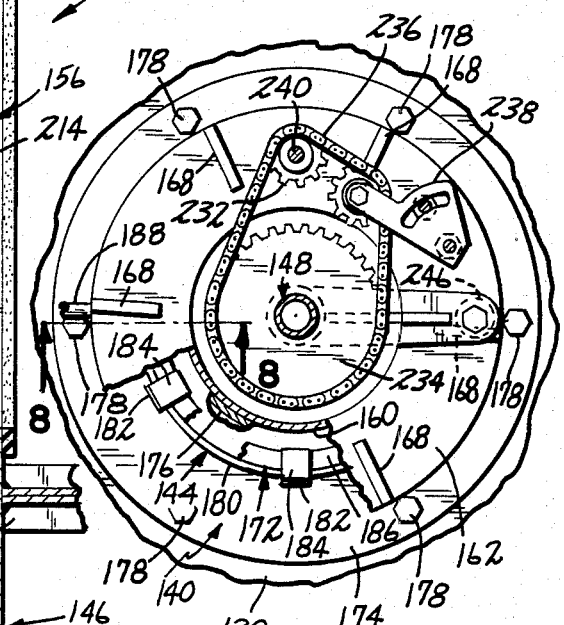
FIG. 7 is a view, partially in cross section, taken along line 7—7 of FIG. 3.

As shown in FIG. 7, drive sprocket 232 drives driven sprocket 234 through chain 236 to rotate blowpipe 148. Takeup mechanism 238 of a type known to those skilled in the art keeps chain 236 tight. Takeup mechanism 238 is fastened as appropriate to top 136 of housing 102. Driven sprocket 234 is fastened to the upper portion of blowpipe 148 just beneath top 136. Drive sprocket 232 is fastened to shaft 240 extending downwardly through top 136 from gearbox 242 (see FIG. 2). Gearbox 242 is driven by motor 158.

As shown in FIG. 3, solenoid 246 which operates plunger 170 is held from a bracket 248 attached to hub 250 of driven sprocket 234. Motor 158 and gearbox 242 may be controlled in a fashion known to those skilled so as to drive blowpipe 148 incrementally to align nozzles 156 with a column of filter elements momentarily before proceeding to another column. When it is necessary to service or replace a column of filter elements, solenoid 246 may be operated to allow plunger 170 to extend and contact one of stops 168 so that as blowpipe 148 is caused to rotate, clean air drum 140 similarly rotates and may be stopped when a column of filter elements 142 is adjacent to door assembly 114 of housing 102. Elements 142 are then easily serviced or replaced.

A low pressure, high volume, air pressure pulse is furnished by apparatus 10. Apparatus 10 includes pressurized container 12 having valve mechanism 21. Container 12 is pressurized through pipe 252 by compressor 254 powered by motor 256.

As shown in FIGS. 9 and 10, apparatus 10 includes a container 12 which may be pressurized at inlet passage 14. Container 12 preferably includes a head 16 or other mechanism for easy entry to the interior of container 12.

Both container 12 and head 16 are flanged so they may be fastened together with nut and bolt combinations 18 and a gasket 19 or other sealing device.

Apparatus 10 further includes first and second valves 20 and 22. First valve 20 must have its third ports 30 in fluid communication with the interior of container 12 while second valve 22 must have its third ports 82 in fluid communication with the exterior of container 12. Therefore, it is preferable if first valve 20 is essentially located within the interior of container 12, while second valve 22 is located generally exterior to container 12. Although it is not necessary, as shown in the figures, valves 20 and 22 have a common housing 24. With respect to first valve 20, housing 24 includes first, second and third ports 26, 28 and 30, respectively, and an enclosure 32. First port 26 is a circular opening in the bottom 25 of housing 24. A tube 34 is welded or otherwise attached to housing 24 at port 26. Tube 34 is connected via a flexible tube 36 to an exhaust passage 38 formed or otherwise made in the wall of container 12. Port 26 has a bevel 40 bordered by a gasket 42 at its inner lip. Both bevel 40 and gasket 42 cooperate to form a seat for spherical ball 44. Second port 28 is located at the end of enclosure 32 opposite first port 26. Second port 28 is separated from, but in fluid communication with, first port 46 of second valve 22. The two ports 28 and 46 are separated by an annular protrusion 48 which functions as a stop or seat for coil spring 50. Spring 50 biases ball 44 against first port 26 so that first valve 20 is normally closed at first port 26. Cap 52 is contoured to mate with ball 44, and has a stub 54 attached integrally or otherwise to it for fitting within the spiral of spring 50. Cap 52 allows ball 44 to turn arbitrarily each time it oscillates within enclosure 32 without being scratched by spring 50. Ball 44, therefore, does not wear excessively in any one location.

Third port 30 is a plurality of openings about the wall of housing 24 at a location between the end 25 of housing 24 and the point along wall 56 where ball 44 is nearest wall 56 when ball 44 is seated to seal port 26. The combined cross sectional area of the third ports 30 is greater than the cross sectional area of the first port 26 of first valve 20.

Enclosure 32 has a flat surface 58 at end 25 of housing 24, and a cylindrical side 60 adjacent to surface 58. Side 60 matches hemispherical end 62 opposite surface 58. Enclosure 32 has length such that the distance between the lowermost point of ball 44 when ball 44 is forced as far as it can go into hemispherical end 62 and the plane defined by the upper end of first port 26 at enclosure 32 is at least 75% of the inside diameter of first port 26. Preferably, the indicated lift distance of ball 44 is 75% to 100% of the inside diameter of first port 26.

Spherical ball 44 has a diameter relative to the diameter of cylindrical wall 60 such that the total clearance area between the closest circumference of ball 44 to wall 60 and wall 60 is at least three times less than the smallest cross sectional area of the passage between first and second valves 20 and 22.

Second valve 22 is formed in the end of housing 24 which protrudes externally from container 12. The end 64 opposite end 25 has a circular opening with a machined groove into which fits a cover 66 fastened in place with bolts 68 which are threaded into housing 24. Cover 66 is frusto-conically shaped with the greater diameter mating with the flange attachment to end 64 of housing 24. The smaller diameter mates with a cylindrical plug 70 into which solenoid valve 72 threads. Bolts 68 hold diaphragm 74 between the flange of cover 66 and end 64 of housing 24. The centermost portion of diaphragm 74 is biased against first port 46 of second valve 22 by coil spring 76. In this fashion, second valve 22 is normally closed at first port 46. Diaphragm 74 includes a bleed opening 78 which allows pressurized fluid from enclosure 32 above ball 44 to leak through diaphragm 74 to equalize the pressure on both sides of diaphragm 74.

As with first valve 20, second valve 22 also has first, second and third ports 46, 80 and 82, respectively. First port 46 mates with second port 28 of first valve 20. First port 46 may be the same diameter as the annular protuberance 48 or, as shown in FIG. 9, may be slightly larger such that spring 76 can fit therein and force diaphragm 74 slightly downwardly therein to provide an effective seal at the edges of first port 46. Second port 80 is an opening in cylindrical plug 70 which communicates with solenoid valve 72. Third port 82 is one or more openings in the sidewall of housing 24 in the portion exteriorly of container 12. When diaphragm 74 is closed against first port 46, third port 82 is blocked by diaphragm 74 from communication with the other ports.

In use, solenoid valve 72 is normally closed. Springs 76 and 50 force diaphragm 74 and ball 44 into sealing configurations with first ports 46 and 26 of second and first valves 22 and 20, respectively. In this configuration, exhaust passage 38 is closed and container 12 may be pressurized through inlet port 14. As container 12 pressurizes, gaseous fluid bleeds around ball 44 to pressurize enclosure 32 on the unsealed side of ball 44. At the same time, gaseous fluid bleeds through opening 78 to pressurize space 84 on the side of diaphragm 74 opposite first port 46.

With container 12 pressurized, solenoid valve 72 may be operated which in turn causes a change in configuration of second and first valves 22 and 20 thereby allowing the pressurized fluid in container 12 to rapidly dump through tubes 34 and 36 and exhaust passage 38 to create a pressure pulse. More particularly, as shown in FIG. 10, solenoid valve 72 is opened to relieve overambient pressure in space 84. Since the bleed opening 78 in diaphragm 74 is relatively small, overambient pressure in enclosure 32 cannot bleed rapidly enough through opening 78 to prevent the pressure beneath diaphragm 74 from forcing diaphragm 74 to compress spring 76. When diaphragm 74 is thus forced away from first port 46, the overambient pressurized fluid in enclosure 32 flows from second port 28 of first valve 20 through first port 46 and third port 82 to exhaust to ambient external of container 12. With the pressure on one side of ball relieved, pressurized fluid from container 12 flows through third ports 30 to contact a ringular portion of the side of ball 44 opposite spring 50 thereby forcing ball 44 to compress spring 50 against protruberance 48. Furthermore, since pressure is rapidly relieved from space 84 and since the passage between second and first valves 22 and 20 and the fluid path therefrom to port 82 is relatively large in cross section with respect to the volume of enclosure 32 above ball 44, the overambient pressurized fluid in enclosure 32 is rapidly released and ball 44 is impulsively moved from its sealed configuration to an unsealed configuration in contact with the hemispherical end 62 of enclosure 32. Note that FIG. 10 shows ball 44 just beginning to move from its sealed to its unsealed configuration. The phantom lines of FIG. 10 show the ball in its unsealed configuration. With ball 44 away from port 26, pressurized fluid in container 12 flows through ports 30 and beneath ball 44 to port 26 and therefrom through the various tubes to exit passage 38.

When the pressure in container 12 is sufficiently reduced, springs 76 and 50 extend and once again force the ball 44 and diaphragm 74 against first ports 26 and 46.

It is important that ball 44 move upwardly far enough as indicated hereinbefore so that there is sufficient cross section to allow the pressurized fluid in container 12 to move rapidly to the exit path. Note the advantage of using a spherical ball with a mating cap 52 wherein the ball may arbitrarily rotate and, therefore, not wear at the contact locations with port 26 or the bias mechanism.

Note, also, that although it is necessary to have a closure element with slanted sides on which pressurized fluid in container 12 may act to force the element away from sealing first port 26, it is not necessary that the element be a spherical ball as indicated in the preferred embodiment. It is recognized, too, that the closure element of the second element need not be a diaphragm.

It is further noted that first and second valves 20 and 22 are formed in the same housing 24 in the preferred embodiment of FIGS. 9 and 10. Such valves may, however, be separately formed so that first valve 20 is interior to container 12 while second valve 22 is exterior with only a passage between the second port of first valve 20 and the first port of second valve 22. It would also be possible to locate the valves exteriorly of container 12 as long as ports 30 and 26 were appropriately connected with the interior of container 12.

With respect to operational use of collector 100, it is appropriate to first pressurize container 12 of apparatus 10. Contaminated or dirty air is forced into collector 100 at inlet port 150. Some of the particulate matter entrained in the air is cyclonically forced against the sidewall of housing 102 and slides down the wall to the bottom of cone 106. The air is drawn or forced through any of the various columns of filter elements 142. The air proceeds to the inside of a particular filter and then through opening 198 to the interior of clean air drum 140. The air passes from clean air drum 140 to clean air chamber 128 for exhausting from port 152.

When filters 142 become caked with dust or particulate matter, it is desirable to shock them with a reverse pulse of air to loosen the dust cake and allow it to fall into cone 106. From there, airlock 108 is operated either intermittently or continuously to move the material from collector 100. To clean filter elements 142, motor 244 is operated to align the nozzles 156 of blowpipe 148 with a particular column of filter elements 142. Solenoid valve 72 of apparatus 10 is then operated to begin the functioning of valve mechanism 21 as described hereinbefore. The low pressure, high volume quantity of air flows down blowpipe 148 and portions of the pulse are deflected into each nozzle 156 and each subsequent filter element 142 such that a shock wave propagates along both surfaces of the filter elements 142 thereby separating any caked dust from the elements thereby causing it to fall. When a pressure pulse has been initiated and the pressure drops in container 12, valve mechanism 21 closes itself and allows container 12 to be repressurized. Motor 158 is then operated again to rotate blowpipe 148 and align nozzles 156 with another column of filter elements 142. This process continues until all columns of filter elements 142 have been cleaned.

Periodically, filters 142 may require a more thorough cleaning or replacement. Collector 100 advantageously provides for removal of filters 142 from outside housing 102. In particular, solenoid 246 is functioned to project plunger 170. Motor 158 is operated to turn blowpipe 148. Plunger 170 contacts one of stops 168 as blowpipe 148 rotates and, therefore, also rotates clean air drum 140 with its attached columns of filter elements 142. Clean air drum 140 is rotated until a column of filter elements 142 aligns with door assembly 114 in housing 102. A particular filter element 142 may then be removed by unthreading the handles 212 from studs 210 and removing plate 208. A filter 142 is slid outwardly along its holding channels 204. A new filter element 142 is then installed by reversing the indicated procedure. All filter elements 142 may be replaced similarly. When maintenance of the filter elements 142 has been completed, solenoid 246 is again functioned to retract plunger 170 so that blowpipe 148 may rotate independently of clean air drum 140.

It is noted that pressurization of container 12 also pressurizes seal 186 between clean air drum 140 and the fixed bracketry attached to partition 130. Check valve 190 holds the pressurization of seal 186, while valve 192 makes it possible to release such pressurization should that be desirable.

Although these numerous characteristics and advantages of collector 100 and associated pulsing apparatus 10 have been set forth, together with details of structure and function, it is to be understood that the disclosure is illustrative only. Based on the disclosure, one skilled in the art may make changes equivalent to various portions of the device. Therefore, any changes made, especially in matters of shape, size and arrangement, to the full extent extended by the general meaning of the terms to which the appended claims are expressed, are within the principle of this invention.

What is claimed is:

1. Dust collector apparatus, comprising:
    a housing divided into inlet and clean gas chambers, said chambers being separated by a partition, said inlet chamber having an inlet port and said clean chamber having an outlet port, said housing having a top;
    a clean gas drum hung vertically from said partition, said drum having an interior in fluid communication with said clean gas chamber, said drum having a bottom;
    a plurality of filter elements attached to and in flow communication with said drum, the gas cleaned by each of said filter elements flowing into the interior of said drum and continuing to said clean gas chamber; and
    means for producing a reverse gas pulse to clean said elements, said reverse gas pulse producing means including:
        a gas pressure source including means for creating a gas pulse;
        a blow pipe having an opening alignable with an end of each of said filter elements in flow communication with said drum for directing the gas pulse therein;
        means for providing fluid communication between said blow pipe and said pulse creating means; and
        means for rotating said blow pipe with respect to said clean gas drum, said rotating means including first means for bearing said blow pipe at the bottom of said drum and second means for bearing said blow pipe at the top of said housing.

2. Collector apparatus in accordance with claim 1 wherein said clean gas drum is aligned about a substantially vertical axis, said apparatus including means for mounting said filter elements to extend substantially horizontally from said drum.

3. Collector apparatus in accordance with claim 2 wherein said filter element mounting means includes upper and lower support members for slideably holding each of said filter elements, said housing including a sidewall door positioned and arranged in said housing so that said filter elements may be selectively installed and removed therethrough.

4. Collector apparatus in accordance with claim 3 including means for rotating said clean gas drum, said drum rotating means including means for rotatably hanging said drum from said partition, whereby said filter elements may be selectively aligned with said sidewall door in said housing to facilitate filter element installation and removal.

5. Dust collector apparatus, comprising:
 a housing divided into inlet and clean gas chambers, said chambers being separated by a partition, said inlet chamber having an inlet port and said clean gas chamber having an outlet port;
 a clean gas drum supported by said partition, said drum having an interior in fluid communication with said clean gas chamber;
 a plurality of filter elements positioned about said clean gas drum;
 means for removably holding each of said filter elements in contact with said clean gas drum, each of said elements having an interior in fluid communication with the interior of said clean gas drum; and
 means for producing a reverse gas pulse to clean each of said filter elements, said reverse gas pulse producing means including:
 a gas pressure source including means for creating a gas pulse;
 a blow pipe having a plurality of openings selectively alignable with ends of said filter elements in flow communication with said drum for directing the gas pulse into each of said aligned filter elements;
 means for providing fluid communication between said blow pipe and said pulse creating means; and
 means for rotatably driving said blow pipe;
 said gas pressure source including a container and means for pressurizing said container, said container having an exit passage in fluid communication with said blow pipe, and wherein said gas pulse creating means includes:
 first and second valve means for controlling flow of said gaseous fluid, each of said first and second valve means including:
 a walled enclosure with three ports for fluid passage therethrough,
 a closure element
 means for biasing said element to close a first of said ports;
 means for bleeding said fluid from a first space bordered partially by a first side of said element to a second space bordered partially by a second side of said element to equalize pressure on both sides of said element; and
 means for relieving over-ambient pressure from the second side of said closure element of said second valve means;
 the first port of said first valve means being connected to the exit passage of said container, the first port of said second valve means being connected to the second port of said first valve means, the second port of said second valve means being connected to said relieving means and the third port of said first valve means being open to the inside of said container, said third port of said second valve means being open to ambient pressure.

6. Dust collector apparatus, comprising:
 a housing divided into inlet and clean gas chambers, said chambers being separated by a partition, said inlet chamber having an inlet port and said clean gas chamber having an outlet port;
 a clean gas drum supported in a substantially vertical orientation by said partition, said drum having an interior in fluid communication with said clean gas chamber;
 a plurality of filter elements aligned in a plurality of substantially vertical columns about said clean gas drum;
 means for holding each of said filter elements in contact with said clean gas drum, said filter elements having an interior in fluid communication with the interior of said clean gas drum;
 a blow pipe rotatably attached to said housing, said blow pipe having a substantial portion located with said clean gas drum, said blow pipe having a plurality of ejection ports selectively alignable with the interior of said filter elements in one of said columns;
 means for rotatably driving said blow pipe;
 a first gaseous container;
 means for pressurizing said container;
 valve means for creating a shock wave by rapidly releasing the pressurized gas in said container to said blow pipe, said valve means including;
 a second gaseous container having first, second and third ports;
 a spherical ball as a closure element for said first port in fluid communication with said blow pipe, said spherical ball being retained within said second gaseous container, a sealing side of said ball surrounding said first port being exposed through said third port to the pressurized gas in said first container;
 means for biasing said ball against said first port;
 means for bleeding pressurized gas from said first container into said second container for containment on an unsealed side of said ball opposite said first port;
 means for rapidly exhausting the pressurized gas on the unsealed side of said ball through said second port whereby the pressurized gas in said first container overcomes said biasing means and forces said ball away from said first port thereby placing said first and third ports in fluid communication and allowing the pressurized gas in said first container to flow rapidly into said blow pipe to provide a filter cleaning pulse.

* * * * *